US008953665B2

(12) United States Patent
Sindalovsky et al.

(10) Patent No.: US 8,953,665 B2
(45) Date of Patent: Feb. 10, 2015

(54) PATTERN-BASED LOSS OF SIGNAL DETECTOR

(71) Applicant: LSI Corporation, Milpitas, CA (US)

(72) Inventors: Vladimir Sindalovsky, Allentown, PA (US); Mohammad S. Mobin, Allentown, PA (US); Lane A. Smith, Allentown, PA (US)

(73) Assignee: LSI Corporation, Milpitas, CA (US)

( * ) Notice: Subject to any disclaimer, the term of this patent is extended or adjusted under 35 U.S.C. 154(b) by 122 days.

(21) Appl. No.: 13/768,220

(22) Filed: Feb. 15, 2013

(65) Prior Publication Data
US 2014/0233619 A1    Aug. 21, 2014

(51) Int. Cl.
*H04L 27/01* (2006.01)
*H04L 1/20* (2006.01)
(52) U.S. Cl.
CPC ............... *H04L 27/01* (2013.01); *H04L 1/201* (2013.01)

USPC .......................................................... 375/224
(58) Field of Classification Search
CPC ........................................................ H04L 17/00
USPC .......................................................... 375/224
See application file for complete search history.

(56) References Cited

U.S. PATENT DOCUMENTS

| 6,339,833 | B1  | 1/2002 | Guo |
| 6,377,082 | B1  | 4/2002 | Loinaz et al. |
| 8,208,521 | B2  | 6/2012 | Mobin et al. |
| 2013/0148712 | A1* | 6/2013 | Malipatil et al. ............... 375/233 |

* cited by examiner

*Primary Examiner* — Jaison Joseph
(74) *Attorney, Agent, or Firm* — Sheridan Ross P.C.

(57) ABSTRACT

In described embodiments, data pattern-based detection of loss of signal (LOS) is employed for a receive path of serializer/deserializer (SerDes) devices. Pattern-based LOS detection allows for detection of data loss over variety of types of connection media, and is generally insensitive to signal attenuation. More specifically, some described embodiments disclose reliable pattern-based detection of LOS across different connection media for incoming receive data when discreet time decision feedback equalization (DFE) is employed.

20 Claims, 6 Drawing Sheets

PATTERN-BASED LOSS OF SIGNAL DETECTOR

BACKGROUND

In many applications, including digital communications, clock and data recovery (CDR) systems are employed to recover correct timing (e.g., frequency and phase) of an input data stream, which timing is then employed to sample the input data stream to recover the user data for decoding. A serializer/deserializer (SerDes) device is commonly used in high speed communications to convert data between serial and parallel interfaces in each transmit/receive direction.

The SerDes devices often employ an encoding scheme that supports DC-balance, provides framing, and guarantees signal transitions. Guaranteed transitions allow a receiver to extract the embedded clock signal in CDR, while control codes allow framing, typically on the start of a data packet. This encoding scheme also improves error detection with running disparity, providing separation of data bits from control bits, and permits derivation of byte and word synchronization.

The ability to detect the loss of an incoming signal is often a system requirement. Even in systems where loss of signal (LOS) detection is not required, it is often beneficial to be able to determine whether a usable incoming signal is being received. The existing LOS detection mechanisms use analog peak detectors in order to monitor the amplitude of incoming received serial data, compare it to a programmable threshold, and set a LOS flag when the peak amplitude falls below threshold. However, the variety of sources of attenuation in the connection media and dependence on the incoming receive data frequency content makes determining suitable thresholds difficult. Such variations, thus, generally deny generation of a threshold setting universally employed for every possible source of signal attenuation.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, the present invention allows for a pattern-based loss of signal (LOS) detection in a receiver. The LOS detection includes equalization by having a summer and a feedback loop having a decision feedback equalization (DFE) circuit and a slicers circuit, wherein the summer combines a receive serial signal from a channel with DFE feedback to provide a combined signal for the slicers circuit. The LOS detection includes use of a lookup table having i) DFE adaptation values, ii) a slicer output from the slicers circuit, and iii) a programmable noise threshold, wherein, when a lookup value in the lookup table falls below the programmable noise threshold, the lookup table generates an expected signal at the slicers circuit in absence of the receive serial signal and generates a mask bit along with an expected bit if a DFE level is below an expected noise level. The LOS detection also compares the slicer output with the expected signal; and a LOS accumulator and counter circuit accumulates the comparison results from the comparator over pre-determined number of receiver characters, wherein a pattern based LOS indicator from the LOS accumulator and counter circuit is set if a signal pattern of the slicer output is defined by the DFE feedback from the equalizer.

BRIEF DESCRIPTION OF THE DRAWING FIGURES

Other aspects, features, and advantages of the present invention will become more fully apparent from the following detailed description, the appended claims, and the accompanying drawings in which like reference numerals identify similar or identical elements.

DETAILED DESCRIPTION

Hereinafter, embodiments of the present invention are described with reference to the drawings.

Described embodiments relate to data pattern-based detection of loss of signal (LOS) for a receive path of serializer/deserializer (SerDes) devices. Pattern-based LOS detection allows for detection of data loss over variety of types of connection media, and is generally insensitive to signal attenuation. More specifically, some described embodiments disclose reliable pattern-based detection of LOS across different connection media for incoming receive data when discreet time decision feedback equalization (DFE) is employed. Described embodiments perform a comparison based on upon the decisions generated for inputs to a slicer and resulting adapted equalizer values, declaring a loss of signal when adapted equalizer values correspond to slicer decisions in the presence of noise (e.g., loss of signal).

The following detailed description utilizes a number of acronyms, which are generally well known in the art. While definitions are typically provided with the first instance of each acronym, for convenience, Table 1 provides a list of the acronyms and abbreviations used along with their respective definitions.

TABLE 1

| | |
|---|---|
| SerDes | Serializer/Deserializer |
| LOS | Loss of Signal |
| VGA | Variable Gain Amplifier |
| RXFE | Receive Front End |
| DFE | Decision Feedback Equalization |
| RXEQ | Receiver Equalization |
| LUT | Lookup Table |
| ISI | Inter-Symbol Interference |
| CDR | Clock and Data Recovery |
| VCO | Voltage Controlled Oscillator |
| LMS | Least Mean Square |
| LTI | Linear Time-Invariant |

Note that herein, the terms "data", "signal", and "data bit" are used interchangeably. It is understood that data may correspond to, or contain a signal, or a data bit and that the signal and the data bit may refer to the data.

Figure 1:
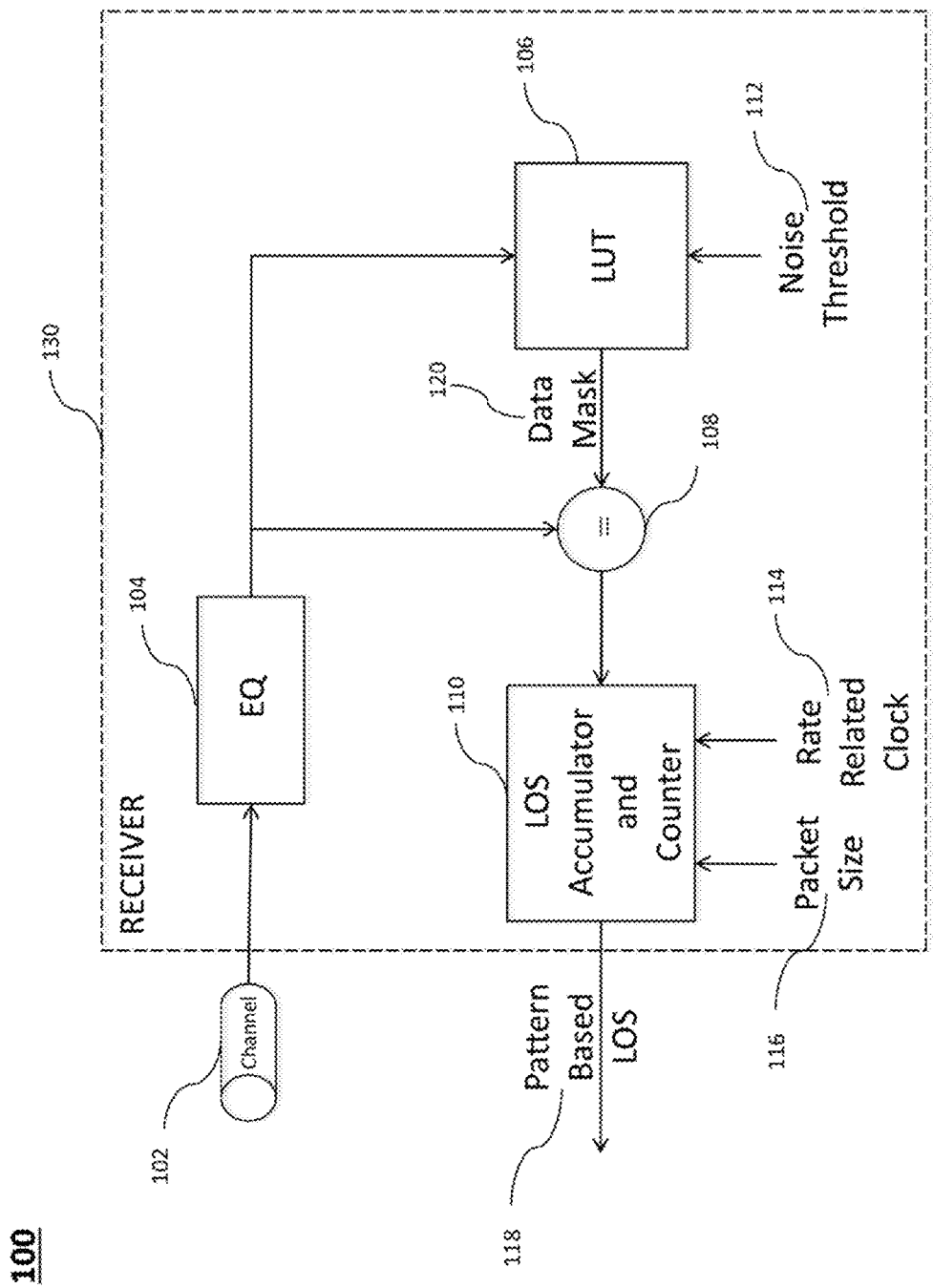
FIG. 1 shows a block diagram of a LOS detector with a receiver operating in accordance with exemplary embodiments.

FIG. 1 shows a block diagram of LOS detection system 100 with a receiver operating in accordance with exemplary embodiments of the present invention. System 100 includes communication channel 102 that provides incoming serial signals into receive equalizer (EQ) 104 in receiver 130. Channel 102, which may be wired, wireless, optical or some other type of connection media, has an associated transfer function, loss characteristics, and/or other sources for adding impairments to the incoming serial signal passing through it. System 100 further includes EQ 104 that applies equalization to the received signal to correct for frequency losses/variations, inter symbol interference (ISI) or other impairments applied to the signal by channel 102. EQ 104 includes an analog front end (AFE) equalizer followed by a DFE equalizer, but other types of equalization may be employed. EQ 104 also includes filtering and gain elements. EQ 104 further includes sampling and deserializing elements, such as a slicer circuit and a deserializer. Outputs from EQ 104 include deserialized signals and DFE adaptation values.

Receiver 130 further includes lookup table (LUT) 106, comparator 108, and LOS accumulator and counter 110. LUT 106 receives the outputs from EQ 104 and programmable noise threshold 112 to calculate expected data from the equalizer in absence of the incoming serial signal. Whenever a lookup in LUT 106 falls below programmable noise threshold 112, LUT 106 generates a mask bit shown as data mask 120 along with the expected data bit.

The output from EQ 104 is compared to the expected data bit from LUT 106 at comparator 108 and optionally masked if an EQ level is below an expected noise level. The comparison result is accumulated at LOS accumulator and counter 110 over a programmable number of received characters. Such programmable number might be derived for, for example, the values of rate related clock 114 and packet size 116. If a receiver deserialized pattern is defined by the DFE feedback pattern (i.e., the DFE output, where, for the embodiments herein, masked bits might be optionally excluded), then the value of pattern-based LOS indicator 118 may be set high indicating a loss of signal.

When the incoming serial data from channel 102 is substantially similar to the expected DFE feedback pattern, this would be equivalent to a Nyquist pattern sent through channel 102. Thus, the value of pattern based LOS indicator 118 may be set high despite the incoming serial data typically causing receiver 130 to freeze or reset. A detailed description of the conditions under which this particular scenario may occur is described subsequently with respect to FIG. 5.

The data when transmitted is usually split into packets with special data inserted at the beginning and/or at the end of each packed. If packet size 116 is known and can be programmed at packet size input, then LOS accumulator and counter 110 may check for repeated inequality of deserialized data vs. expected DFE feedback pattern. If inequality repeats over packet size intervals around these special data, then the received data is present, and pattern based LOS indicator 118 is reset (or not set high).

Figure 2:
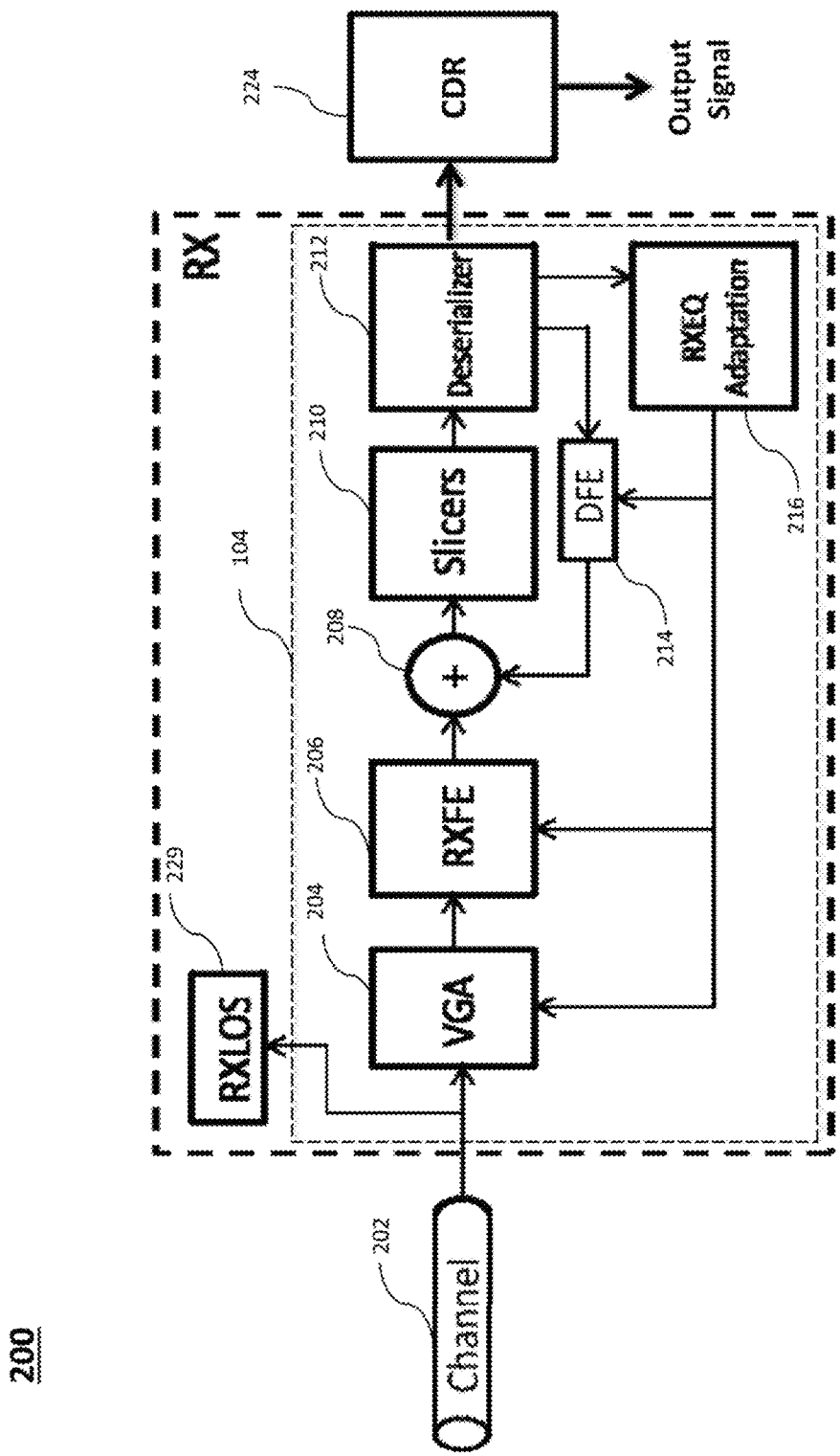
FIG. 2 shows a block diagram of the equalizer shown in FIG. 1 in a SerDes receiver having LOS detection in accordance with exemplary embodiments.

FIG. 2 shows a block diagram of an exemplary embodiment of the equalizer shown in FIG. 1 in a SerDes receiver having LOS detection. As shown, system 200 includes channel 202, variable gain amplifier (VGA) 204, receiver front end (RXFE) 206, summing node 208, slicers 210, deserializer 212, decision feedback equalizer (DFE) 214, receiver equalizer (RXEQ) adaptation 216, CDR 224, and receiver LOS module (RXLOS) 229.

Channel 202, which may be wired, wireless, optical or some other connection media, has an associated transfer function, loss characteristics, and/or other sources adding impairments to signals passing through it.

System 200 receives an incoming serial signal from channel 202, and performs signal enhancements before sampling the incoming serial signal in slicers 210 in order to perform clock and data recovery in CDR 224. Such enhancement includes amplifying the incoming serial data from channel 202 in VGA 204, and filtering of the frequency band in RXFE 206 in order to compensate for frequency dependent degradation of the serial data from channel 202 in the channel media. VGA 204 and RXFE 206 are generally implemented by analog means.

Figure 3:
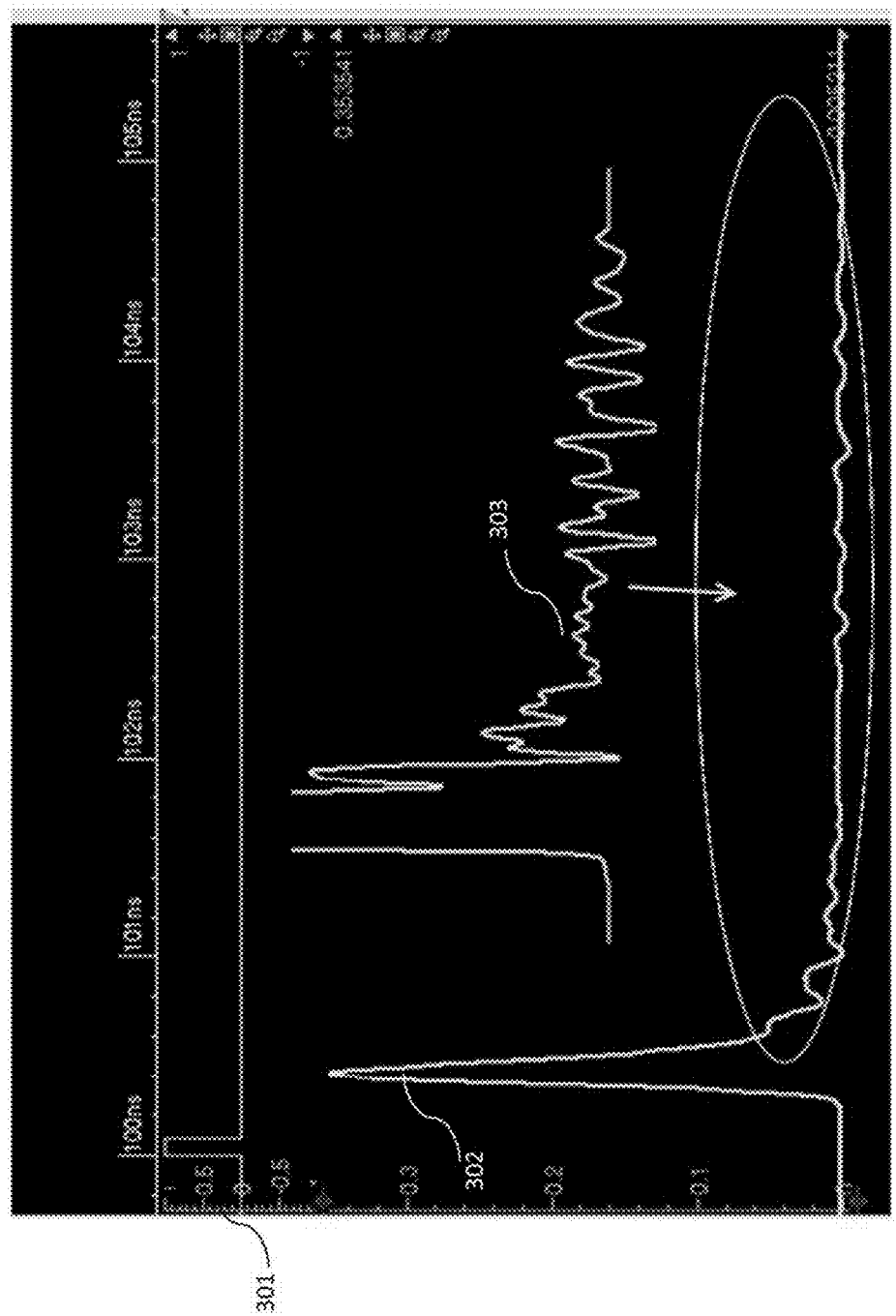
FIG. 3 shows a pulse response function for serial data sampling of the SerDes receiver shown in FIG. 2.

Channel 202 influences the incoming serial data in a way which can be described as an inter-symbol interference (ISI). The ISI is a form of distortion of a signal in which energy of one symbol interferes with subsequent symbols. ISI adds signal noise and distortion, thus making the communication less reliable. The ISI is usually caused by multipath propagation or the inherent non-linear frequency response of the channel, causing successive symbols to "blur" together. The presence of the ISI in the system introduces errors in the decision device at the receiver output. Therefore, in the design of the transmitting and receiving filters, the objective is to minimize the effects of the ISI, and thereby deliver the digital data to its destination with the smallest error rate possible. The ISI of a channel may be characterized by using a pulse response function, such as the pulse response function shown in FIG. 3. In FIG. 3, at time 100 ns, a unit-amplitude, one unit interval UI (corresponding to the data rate) rectangular pulse 301 is applied to a channel to be characterized, and the output of the channel comprises a distorted pulse 302. Distorted pulse 302 has major, 1 UI pulse from 100.3 ns to 100.6 ns, but energy 303 is also spread from 100.6 ns to 105 ns.

Depending on when the signal is sampled, the receiver may make incorrect decisions, resulting in bit-errors. Hence, for multi-Gb/s data rates to be viable in such channels, some form of channel equalization is generally employed. The channel equalization can be accomplished through a number of techniques, such as high pass filtering, filtering of the data at transmitters and/or receivers (also known as feed-forward equalization or FFE), impedance matching using tunable impedance matching networks, and other techniques well known in the art of communications.

In one exemplary embodiment, a particular form of equalization known as decision feedback equalization (using a decision feedback equalizer) is applied at the receiver to restore the incoming signal and compensate for the impairments. Assuming channel 202 is a linear time-invariant (LTI) channel, the ISI may be described as a deterministic superposition of time-shifted smeared pulses. The DFE then uses information about previously received data bits to cancel out their ISI contributions from a current decision.

A decision feedback equalizer is a filter that uses feedback of detected symbols in addition to conventional equalization of currently received (and sometimes future—for TX equalization) symbols. Some systems use predefined training sequences to provide reference points for the adaptation process of a DFE technique to generate tap values applied to detected symbols, to estimate time-shifted pulse energy distortion contributions to a current, received symbol.

According to the DFE technique, feedback compensation is applied to the incoming serial data based on the previously received serial data in order to compensate for the ISI. DFE 214 may be implemented in a continuous time domain, but more often DFE 214 is implemented in a discreet time domain.

As described with respect to FIG. 2, discreet time DFE 214 stores previously received serial data, applies corresponding DFE tap weights to the serial data, and applies the processed serial data to summing node 108 (between RXFE 206 and slicers 210). Previously received serial data $y_k$ is multiplied by corresponding coefficients according to relation (1).

$$y_i = x_i - \sum_{k=1}^{k=n} c_k * w_k * y_{i-k} \qquad (1)$$

where n is a depth of DFE correction, $c_k$ is an adapted DFE coefficient value, $w_k$ is weight of a binary bit in mV/bit, $x_i$ is incoming RX serial data. $y_i$ is a current bit of serial data at the slicers input, and $y_{i-k}$ is previously received data that the DFE corrected.

The depth of the DFE correction n can vary, and typically is set during a particular implementation as a trade-off between complexity (e.g., number of DFE filter taps and operations) and the energy spread of the ISI. In one exemplary embodiment, DFE 214 is implemented as a 6 tap DFE. Depending on the value of the stored latest 6 bits of received data, the DFE feedback is subtracted from the output of RXFE 206 if the corresponding stored data bit is "1", and added from the output of RXFE 206 if the corresponding stored data bit is "0". The magnitude of added or subtracted value is defined by the digital value of the corresponding DFE tap $c_i$ and its weight $w_i$.

Each DFE coefficient value $c_k$ is typically adapted using RXEQ adaptation 216. One of the existing ways to adapt DFE coefficient $c_k$ uses a least mean square (LMS) algorithm based on the pulse representation of FIG. 3.

Figure 4:
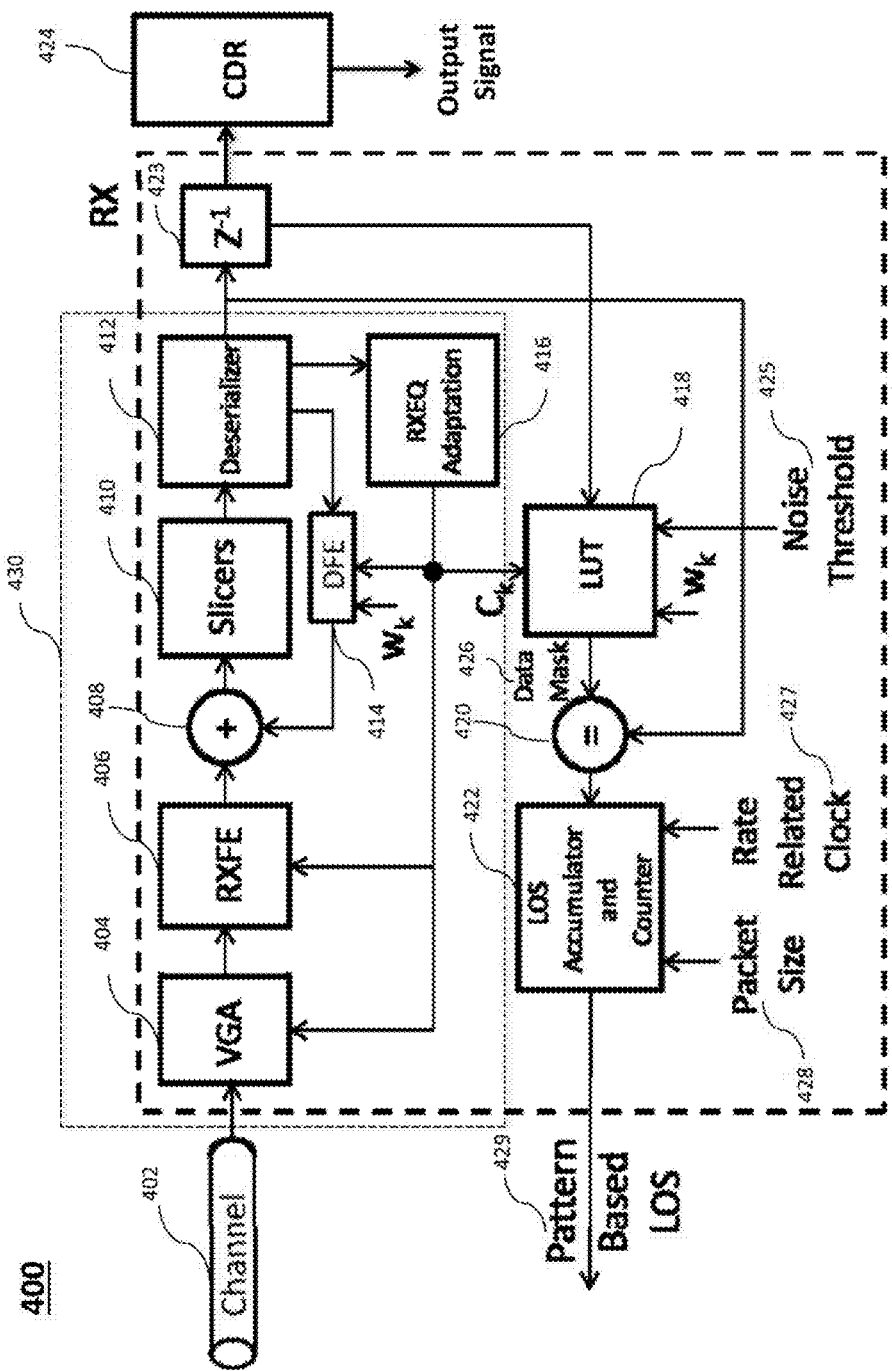
FIG. 4 shows a block diagram of a pattern based LOS detector in a SerDes receiver operating in accordance with exemplary embodiments.

FIG. 4 shows a block diagram of a pattern based LOS detector in a SerDes receiver operating in accordance with exemplary embodiments, which might operate in conjunction with the equalizer of FIG. 2. As an aide to understanding the operation of the equalizer of FIG. 2 and the LOS detector of the FIG. 4, a brief discussion of decision feedback equalization follows.

Figure 5:
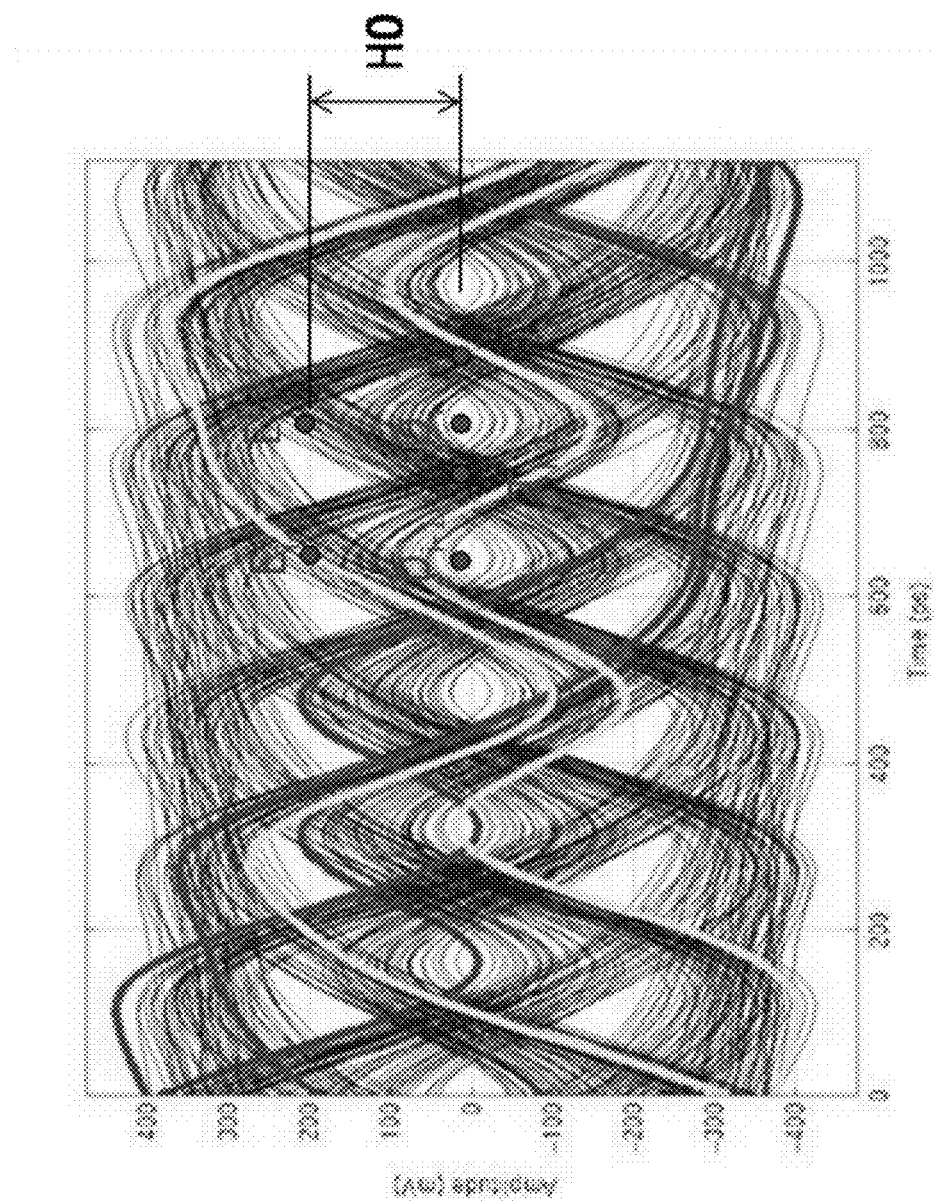
FIG. 5 shows an eye diagram of the serial data at the slicers of the SerDes receiver shown in FIGS. 2 and 4.

FIG. 5 shows an eye diagram of the received serial data as applied at the slicer circuits (e.g., slicers 210) of the SerDes receiver shown in FIG. 2. As shown in FIG. 5, $D_i$ is a position of data slicer, $E_i$ is a position of error slicer, and $T_i$ is a position of the transition slicer used in CDR 224 for phase detection. In this exemplary embodiment, one error latch threshold (shown as H0) per data eye is shown, but there may be two error latches per data with positive and negative offsets.

The adaptation of the DFE coefficient c, first adjusts vertical offset of the error latch H0 putting it at the statistical middle of inner and outer eye spreads. The adaptation of the H0 is described by relation (2) that represents the LMS algorithm using the data and error latches with the same index.

$$H0 = \overline{(\hat{D}_k E sign_k)} ? \sum_0^\infty \overline{(\hat{D}_k E_k)} \qquad (2)$$

After the H0 is adapted, the adaptation of the DFE coefficients $c_k$ starts. The adaptation of the DFE coefficients $c_k$ may be described by the LMS algorithm by relation (3) where the offset between indexes of the error and data latches corresponds to the DFE coefficient index.

$$Cn = \overline{(\hat{D}_k E sign_k)} ? \sum_0^\infty \overline{(\hat{D}_{k-n} E_k)} \qquad (3)$$

Adapted DFE coefficients $c_n$ provide for the optimized vertical opening of receiver eye compensating to the ISI.

Returning to FIG. 2, RXLOS 229 is coupled to receive the incoming serial data before analog equalization and DFE feedback. The LOS plays an important role in operation of CDR 224 because locking to the incoming serial data and RXEQ adaptation 216 in absence of valid receive serial data might cause errors in the receiver processing. The noise presented at the output of channel 202 may be sliced to full digital levels in slicers 210, and then CDR 224 and RXEQ adaptation 216 may attempt to lock and adapt to this sliced noise. In this case, the LOS freezes or resets the initial state of CDR 224 and RXEQ adaptation 216 in the absence of the valid receive serial data signal.

As shown in FIG. 5, decision feedback equalization applied by DFE 214 distorts the data eye diagram, and so the signal applied to slicers 210, because the DFE feedback signal is generally of greater amplitude than incoming noise (in absence of valid receive data), so, an output signal of summing node 208 is predominantly defined by the DFE feedback signal from DFE 214. This may cause, if not prevented as described subsequently, a runaway condition for loops of CDR 224 and RXEQ adaptation 116. In one exemplary embodiment, when the C1 having greater magnitude than a sum of other DFE coefficients, i.e., the sum of absolute values of C2 through C6, summing node 208 has a Nyquist pattern (i.e., "1010 . . .") at its output.

Then, the expected data at slicers 210 in absence of the receive data may be derived from relation (1) and expressed by relation (4).

$$y_i = \text{noise} - \sum_{k=1}^{k=n} c_k * w_k * y_{i-k} \qquad (4)$$

where noise is an expected noise value from the channel, and other parameters are equivalent to those of the relation (1).

A variety of connection media with different signal attenuation characteristics that are not known to the receiver generally makes a digital implementation preferred over an analog implementation, because frequency dependence of attenuation for different connection media varies greatly (e.g., VGA 204 and RXFE 206 are generally implemented by analog circuitry, but a digital implementation of the LOS detector such as RXLOS 229 might be preferred). For example, when the Nyquist pattern is received, the Nyquist pattern usually experiences the highest attenuation in channel 202. The received Nyquist pattern may fall below threshold level of RXLOS 229, causing CDR 224 and RXEQ adaptation 216 to freeze or reset, and disturbs the receive path leading to burst of errors.

Returning to FIG. 4, system 400 includes equalizer 430, lookup table (LUT) 418, comparator 420, LOS accumulator and counter 422, delay element $Z^{-1}$ 423, and CDR 424, to provide a value for pattern based LOS 429. Equalizer 430 coupled to channel 402 includes VGA 404, RXFE 406, summing node 408, slicers 410, deserializer 412, DFE 414, and RXEQ adaptation 416. The differences between the embodiments of FIG. 2 and FIG. 5 are in FIG. 5, lookup table (LUT) 418, comparator 420, and LOS accumulator and counter 422 are added after equalizer 430, and pattern based LOS 429 is placed after lookup table (LUT) 418, comparator 420, and LOS accumulator and counter 422.

As shown in FIG. 4, adapted DFE coefficients c are provided to LUT 418 along with coefficient weights $w_k$ and deserialized data from deserializer 412 and delay element $Z^{-1}$ 423. Since LUT 418 stores the real amplitude of DFE correction based on adapted coefficients and weights, LUT values are converted to digital logic levels before comparison with the deserialized data. The conversion might be, for example, a positive lookup value being set as logic "1" and a negative lookup value being set as logic "0". LUT 418 calculates the expected output data from slicers circuit 410 and deserializer 412 in absence of the incoming serial data according to the relation (4) (here, assuming noise=0). In one exemplary embodiment, DFE 414 is a 6 tap DFE. In this case, there are 64 possible combinations of the previous sliced and deserialized data, thus, LUT 418 may have 64 lookup positions. Some of the combinations of the previous deserialized data may yield low DFE feedback comparable with expected noise from channel 402. Thus, programmable noise threshold 425 is provided as an input to LUT 418. Whenever a lookup value in LUT 418 falls below programmable noise threshold 425, LUT 418 generates a mask bit shown as data mask 426 along with the expected data bit.

Newly sliced bit (e.g., output data from deserializer 412) before delay element $Z^{-1}$ 423 is compared to the expected data bit from LUT 418 at comparator 420 and optionally masked if a DFE level is below an expected noise level. The comparison result is accumulated in LOS accumulator and counter 422 over pre-determined number of receiver characters, such as, rate related clock 427 and packet size 428. The pre-determined number of the receiver characters is a programmable number. If the receiver deserialized pattern is always defined by the DFE feedback (here. masked bits optionally excluded), then pattern based LOS indicator 429 may be set high.

If the receive serial data from channel 402 is exactly the same as the expected DFE defined pattern, that is, for example, the Nyquist pattern sent through channel 402 from the exemplary embodiment described above with C1 exceeding the sum absolute values of C2-C6, an unresolved scenario may exist. In this case, pattern based LOS indicator 429 may be set high despite the incoming data being received from channel 402 causing CDR 424 and RXEQ adaptation 416 to freeze or reset.

The received data when transmitted is usually split into packets with special data inserted at the beginning and/or at the end of each packed. If packet size 428 is known and can be programmed at packet size input then LOS accumulator and counter 422 may check for repeated inequality of de-serialized data versus the expected DFE pattern. If the inequality repeats over packet size intervals, then the received data is present, and the value of pattern-based LOS 429 is not set high. Pattern-based LOS detector 429 as shown in the exemplary embodiment, such as FIG. 4, allows for detection of loss of data over variety of connection media, and insensitive to signal attenuation.

Figure 6:
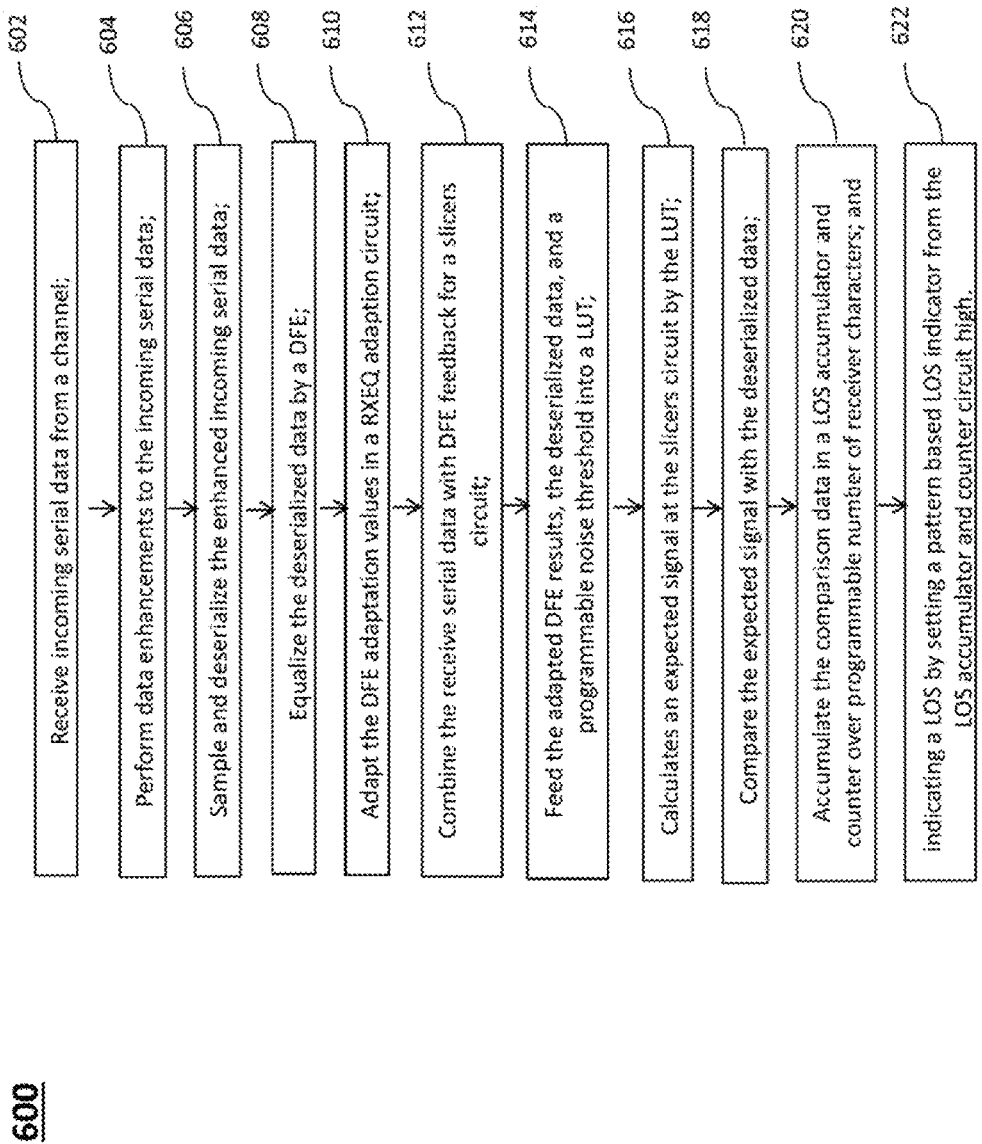
FIG. 6 shows a flowchart of a method for detecting LOS in the SerDes receiver shown in FIG. 5.

FIG. 6 shows a flowchart of a method 600 for detecting LOS in the SerDes receiver shown in FIG. 4. As shown, incoming serial data is received from channel 402 at step 602. Some signal enhancements are performed at step 604 before sampling incoming serial data in slicers circuit 410 (at step 606) in order to perform CDR function in CDR 424. Such enhancement includes amplifying the incoming serial data from channel 402 in VGA 404, and filtering frequency in RXFE 406 in order to compensate for frequency dependent degradation of the serial data from channel 402 in channel media. At step 606, the enhanced incoming serial data is sampled in slicers 410 and converted to the deserialized data by deserializer 412. At step 608, channel equalization is performed by DFE 414 (which may be implemented in a discreet time domain). DFE 414 memorizes previously received serial data and applies it to summing node 408 between RXFE 406 and slicers 410 multiplied by corresponding coefficients according to relation (1). At step 610, DFE values including DFE coefficients and corresponding weights are adapted in RXEQ adaptation circuit 416. At step 612, the enhanced incoming serial data is combined with DFE feedback (i.e., DFE output signal) to provide a combined signal for slicers circuit 410.

At step 614, the adapted DFE values, and the deserialized data from deserializer 412 and delay element $Z^{-1}$ 423 are fed into LUT 418 that calculates an expected signal at the slicers circuit 410 or deserializer 412 in absence of the receive serial signal and generates a mask bit along with an expected data bit if a DFE level is below an expected noise level, when a lookup in the lookup table falls below the programmable noise threshold. At step 618, the deserialized data is compared to the expected signal from LUT 418 at comparator 420 and optionally masked if a DFE level is below an expected noise level. At step 620, the comparison result is accumulated in LOS accumulator and counter 422 over programmable number of receiver characters, such as, rate related clock 427 and packet size 428. At step 622, pattern based LOS indicator 429 is set by the accumulated results of LOS accumulator and counter 422. If a deserialized data pattern is defined by the DFE feedback (here, masked bits optionally excluded), then the value of pattern based LOS indicator 429 is set high.

Referring herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments of the present invention have been described with respect to processes of circuits, including possible implementation as a single integrated circuit, a multi-chip module, a single card, or a multi-card circuit pack, the present invention is not so limited. As would be apparent to one skilled in the art, various functions of circuit elements may also be implemented as processing blocks in a software program. Such software may be employed in, for example, a digital signal processor, micro-controller, or general purpose computer.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

No claim element herein is to be construed under the provisions of 35 U.S.C. §112, sixth paragraph, unless the element is expressly recited using the phrase "means for" or "step for."

It will be further understood that various changes in the details, materials, and arrangements of the parts which have been described and illustrated in order to explain the nature of this invention may be made by those skilled in the art without departing from the scope of the invention as expressed in the following claims.

We claim:

1. A pattern-based loss of signal (LOS) detector of a serializer-deserializer (SerDes) receiver, the LOS detector comprising:
an equalizer including a combiner and a feedback loop having a decision feedback equalization (DFE) circuit and a slicers circuit, wherein the combiner combines a receive serial signal from a channel with DFE feedback to provide a combined signal for the slicers circuit;
a lookup table having i) DFE adaptation values, ii) a slicer output from the slicers circuit, and iii) a programmable noise threshold, wherein, when a lookup value in the lookup table falls below the programmable noise threshold, the lookup table generates an expected signal at the slicers circuit in absence of the receive serial signal and generates a mask bit along with an expected bit if a DFE level is below an expected noise level;
a comparator comparing the slicer output with the expected signal; and
a LOS accumulator and counter circuit accumulating the comparison results from the comparator over pre-determined number of receiver characters,
wherein a pattern based LOS indicator from the LOS accumulator and counter circuit is set if a signal pattern of the slicer output is defined by the DFE feedback from the equalizer.

2. The LOS detector of claim 1 wherein the pre-determined number of the receiver characters is programmable.

3. The LOS detector of claim 1 wherein the equalizer includes a signal enhancement circuit adapted to enhance the receive serial signal and receive the DFE feedback to provide an enhanced receive signal.

4. The LOS detector of claim 3 wherein the signal enhancement circuit includes a variable gain amplifier adapted to amplify the receive serial signal from the channel.

5. The LOS detector of claim 3 wherein the signal enhancement circuit includes a receiver front end circuit adapted to apply a frequency filtering to compensate for frequency dependent degradation of the receive serial signal from the channel.

6. The LOS detector of claim 1 wherein the equalizer includes a deserializer adapted to deserialize the receive serial signal.

7. The LOS detector of claim 1 wherein the equalizer includes an equalization adaptation circuit configured to adapt the DFE adaptation values including values of each DFE coefficient and coefficient weight.

8. The LOS detector of claim 7 wherein the DFE values are adapted using least mean square (LMS) algorithm.

9. The LOS detector of claim 8 wherein the DFE memorizes the previously received signal and applies the previously received signal to the combiner multiplied by the corresponding DFE adaptation values to generate a current bit of serial data at an input of the slicers circuit according to a relation:

$$y_i = x_i - \sum_{k=1}^{k=n} c_k * w_k * y_{i-k}$$

where n is a depth of DFE correction, $C_k$ is an DFE adaptation value, $w_k$ is a weight of the DFE adaptation value, $x_i$ is the receive serial signal, $y_i$ is the current bit of serial data at the input of the slicers circuit, and $y_{i-k}$ is the previously received signal.

10. The LOS detector of claim 1 wherein the receive serial signal includes inter-symbol interference (ISI) from the channel, the channel having a transfer function estimated by the equalizer.

11. The LOS detector of claim 10 wherein, when the channel is a linear time-invariant, the ISI is estimated as a deterministic superposition of time-shifted smeared pulses.

12. The LOS detector of claim 1 wherein the DFE circuit is implemented in a discreet time domain.

13. The LOS detector of claim 1 wherein the DFE circuit is a 6 tap DFE circuit.

14. The LOS detector of claim 3, wherein the combiner is configured to subtract the DFE feedback from an output of the enhancement circuit if the corresponding stored data bit of received data is "1", and added from the output of the enhancement circuit if the corresponding stored data bit of received data is "0".

15. The LOS detector of claim 1, wherein a magnitude of an added or subtracted value is defined by a digital value of corresponding DFE tap coefficient and its weight.

16. The LOS detector of claim 1 wherein the output of the combiner has a Nyquist pattern.

17. The LOS detector of claim 1 wherein the lookup table calculates the expected signal at the slicers circuit in absence of the receive data according to a relation of:

$$y_i = \text{noise} - \sum_{k=1}^{k=n} c_k * w_k * y_{i-k}$$

wherein n is a depth of DFE correction, $c_k$ is an adapted DFE coefficient value, $w_k$ is weight of a binary bit in mV/bit, $x_i$ is incoming serial data, $y_i$ is a current bit of serial data at the slicers input, $y_{i-k}$ is previously received data DFE corrected, and noise is added noise value from the channel.

18. The LOS detector of claim 1 wherein the receiver characters includes a packet size and a rate related clock.

19. A method of detecting loss of signal (LOS) in a circuit, the method comprising the steps of:
performing signal equalization to a receive serial signal from a channel by an equalizer, wherein the receive serial signal is combined with a decision feedback equalization (DFE) feedback signal from a DFE circuit in the equalizer to provide a combined signal for a slicers circuit in the equalizer;
feeding a programmable noise threshold, DFE adaptation values, a slicer output from the slicers circuit into a lookup table circuit, wherein, when a lookup in the lookup table falls below the programmable noise threshold, the lookup table calculates an expected signal at the slicers circuit in absence of the receive serial signal and generates a mask bit along with an expected bit if a DFE level is below an expected noise level;
comparing the slicer output with the expected signal;
accumulating the comparison results from the comparator over pre-determined number of receiver characters in a LOS accumulator and counter circuit; and
indicating a LOS by setting a pattern based LOS indicator from the LOS accumulator and counter circuit high if a signal pattern of the slicer output is defined by the DFE feedback from the equalizer.

20. A non-transitory, machine-readable storage medium, having encoded thereon program code, wherein, when the program code is executed by a machine, the machine implements a method for detecting loss of signal (LOS) in a circuit, comprising the steps of:
performing signal equalization to a receive serial signal from a channel by an equalizer, wherein the receive serial signal is combined with a decision feedback equalization (DFE) feedback signal from a DFE circuit in the equalizer to provide a combined signal for a slicers circuit in the equalizer;
feeding a programmable noise threshold, DFE adaptation values, a slicer output from the slicers circuit into a lookup table circuit, wherein, when a lookup in the lookup table falls below the programmable noise threshold, the lookup table calculates an expected signal at the slicers circuit in absence of the receive serial signal and generates a mask bit along with an expected bit if a DFE level is below an expected noise level;
comparing the slicer output with the expected signal;
accumulating the comparison results from the comparator over pre-determined number of receiver characters in a LOS accumulator and counter circuit; and
indicating a LOS by setting a pattern based LOS indicator from the LOS accumulator and counter circuit high if a signal pattern of the slicer output is defined by the DFE feedback from the equalizer.

* * * * *